METHODS AND APPARATUS FOR MAKING CONDUCTIVE PATTERNS OF PREDETERMINED CONFIGURATION

Filed Aug. 3, 1950

2 Sheets-Sheet 1

INVENTORS.
Kurt Enslein &
Fred J. Haskins
BY T. L. Bowes
Atty

INVENTORS.
Kurt Enslein &
Fred J. Haskins
BY T. L. Bowes
Att'y

Patented Jan. 12, 1954

2,666,008

UNITED STATES PATENT OFFICE 2,666,008

METHODS AND APPARATUS FOR MAKING CONDUCTIVE PATTERNS OF PREDETERMINED CONFIGURATION

Kurt Enslein and Fred J. Haskins, Rochester, N. Y., assignors to Stromberg-Carlson Company, a corporation of New York Application August 3, 1950, Serial No. 177,524

15 Claims. (Cl. 154—94)

Figures 1, 2, 3, 4, 5, 6, 7:
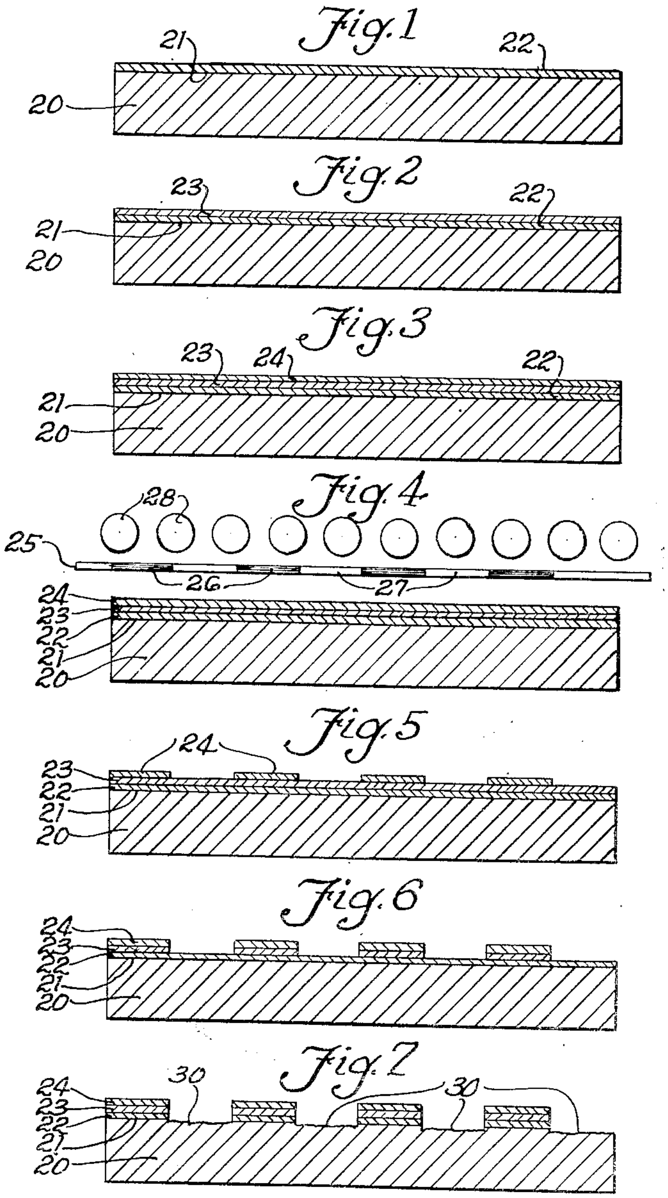

The present invention relates to methods and apparatus for producing an electrically conductive pattern of predetermined configuration on an insulating base member, and the invention has for an object the provision of methods and apparatus of this character which are adaptable to continuous production methods, which entail a minimum of expenditure of unused materials and which are readily adaptable to design changes in the conductive pattern formed.

Within the last several years extensive developments have taken place in the technique of so-called "printed circuits" wherein an electrical circuit having a predetermined configuration is reproduced in two dimensions upon the surface of an insulating base member. While many different techniques have been evolved for depositing an electrically conductive design upon an insulating surface many of these methods have certain inherent disadvantages which prevent their widespread use. In particular, it is desirable to provide a printed circuit technique which is particularly suited for mass production methods, which is capable of reproducing a minutely detailed electrical circuit and which is readily adaptable to accommodate changes in design. Flexibility in design is particularly important, for example, in the mass production of the electrical circuits of radio and television receivers wherein last minute design changes may have to be incorporated in the receiver and it is not economical to scrap a complete set of dies for these minor changes.

While certain arrangements heretofore proposed have employed a photographic resist technique which provides good detail and flexibility of design, these arrangements have generally suffered from the disadvantage that the stencil of resist material must be individually formed on each work piece and is expendable therewith. Additionally, such a process is inherently time consuming and unsuitable for mass production technique.

Accordingly, it is another object of the present invention to provide new and improved methods and apparatus for making conductive patterns of predetermined configuration wherein a conductive material is plated onto a master plate in a predetermined pattern and the plated surface is then transferred onto the insulating base member by adhesion, the master plate being used repeatedly to reproduce successive conductive patterns which are successively transferred to insulating base members.

It is a further object of the present invention to provide new and improved methods and apparatus for making conductive patterns of predetermined configuration in which a conductive material is plated onto a master plate in a predetermined pattern and the plated surface is then transferred onto an insulating base member and wherein the parting characteristics of the plated material and the master plate are substantially improved.

It is a still further object of the present invention to provide new and improved methods and apparatus for producing conductive patterns of predetermined configuration on insulating base members which is particularly suitable for mass production methods and wherein a master plate having conductive areas corresponding to a predetermined pattern is employed successively to transfer conductive material plated thereon onto a plurality of insulating base members.

Briefly, in accordance with one aspect of the invention a conductive pattern of predetermined configuration is provided on an insulating base member by first forming on a conductive master plate a stencil having a configuration which is the negative of the desired conductive pattern. A layer of metal is then plated onto the areas of the master plate which are unmasked by the stencil, the master plate and an insulating base member are coated with an adhesive and the adhesive coated surfaces pressed together to transfer the conductive pattern thus formed onto the insulating base member by adhesion. The master plate may thus be used over and over to transfer conductive patterns plated thereon onto successive insulating base members.

Figures 8, 9, 10, 11, 12, 13, 14:
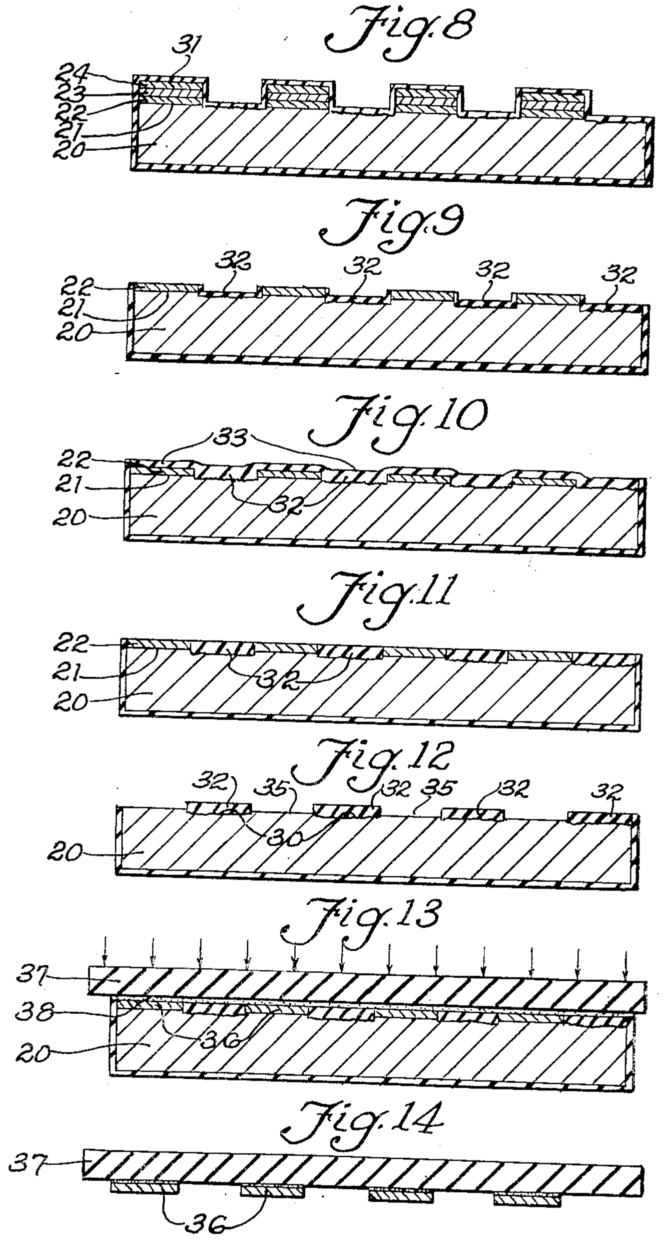

The invention, both as to its organization and method of operation, together with further objects and advantages thereof, will best be understood by reference to the following specification taken in connection with the accompanying drawings, in which:

Figs. 1–12 are greatly enlarged cross sections of a master plate showing the results of successive steps of the process of the present invention, Fig. 12 illustrating the finished master plate; and Figs. 13 and 14 are greatly enlarged cross sections of the master plate of Fig. 12 and the insulating base member onto which the conductive pattern is transferred, Fig. 14 illustrating the finished product.

Referring now more particularly to the drawings, the method of producing conductive patterns of predetermined configuration in accordance with the present invention may be utilized to provide an electrically conductive pattern which is suitable for use in an electrical circuit of any desired type. For example, the electrically conductive pattern formed in accordance with the present invention may be utilized to interconnect the circuit elements of a radio or television receiver or sub-chassis therefor. Alternatively, the electrically conductive pattern may be of the proper configuration to simulate an electrical element such as an inductance, or the like.

In practicing the method of the present invention there is first produced a master plate which is provided with exposed areas which coincide with the pattern in which the eventual electrically conductive lines are to follow, the exposed areas being defined by adjacent areas of an insulating material so that plating does not occur in these areas. The insulating material is preferably one to which adhesive will not readily adhere. The desired conductive metal is then plated onto the exposed areas of the master plate to the desired thickness which is preferably at least as great as the thickness of the surrounding masked areas so that the deposited metal extends above the adjacent master areas. The surface of the master, both the exposed and unexposed areas, is then coated with an adhesive and the insulated base member onto which the plated conductive pattern is to be transferred is likewise coated with a suitable adhesive. The master plate is then pressed against the base member and upon the application of heat and pressure the conductive pattern which was originally deposited on the exposed areas of the master plate parts from the master plate and is transferred to insulating base member. A final cure of the base member is then made under suitable heat and pressure.

Considering now the method by which the master plate may be formed in accordance with the present invention, the master plate is provided with exposed areas arranged in a predetermined pattern, the exposed areas having good parting characteristics for a predetermined electrodeposited metal and having areas which are masked by an insulating material which is also suitably adhesive repellent.

In order to provide a base for the master plate which will have the desirable parting characteristics with respect to the plated metal, the base member 20 of the master plate is preferably of stainless steel. While the stainless steel base plate 20 may be of any suitable alloy having the desired parting characteristics, we have found that the percentage of chromium and nickel is particularly important with respect to the parting characteristics obtained. Specifically, it has been found desirable to employ an alloy containing more than 12% chromium and less than 12% nickel. In this connection, it has further been found that variations in small percentages of molybdenum, silicon, tungsten, carbon, sulphur, and phosphorus do not change the parting characteristics of the stainless steel and, furthermore, do not evidence appreciable change in the properties of the layer of metal which is deposited upon the stainless steel base plate in a manner to be described in more detail hereinafter. To aid the parting of the deposited metal from the stainless base plate, the top surface 21 of the base plate 20 is preferably given a high polish.

With a base plate of stainless steel having approximately 18% chromium and 8% nickel and having a highly polished surface, the base plate 20 is then plated on the polished surface 21 thereof so as to provide a layer 22 of conductive material such as copper, approximately two mils thick. In order that the adhesion of the deposited copper to the stainless steel base plate will not be too great, the above-described plating operation is preferably done in an acid bath, such as a solution of copper fluoborate or copper sulfate.

In order to remove the copper layer 22 in the areas surrounding the eventual conductive pattern there is employed a photographic technique in which a stencil pad which will act as a resist for sand blasting and chemical etching is applied to the plated metal, the photographic stencil being of such photochemical nature that it may be rendered either soluble or insoluble in some reagent by the action of light or other actinic radiation. While any suitable photosensitive resist material may be utilized, we prefer to use a photosensitive latex emulsion, which is sold under the trade name of Kodak Transfax Resist by Eastman Kodak Company of Rochester, New York.

In accordance with this photochemical resist process, the plated master base member of Fig. 1 is covered with a very thin layer 23 of asphaltum, as illustrated in Fig. 2. The asphaltum is applied to the master by spraying or other suitable process of deposition. After spraying the asphaltum onto the plated master, the asphaltum is allowed to dry in a forced air oven operated at approximately 90° F. for a period of time which is dependent upon the size of the work and the thickness of the coating deposited. Ordinarily this drying time takes from ten to thirty minutes.

After the coating 23 of asphaltum is dried, a layer 24 of photosensitive resist material is deposited as illustrated in Fig. 3. The resist layer 24 may comprise the Transfax Resist Kodak catalog No. B-3018 described above, and is sprayed onto the asphaltum layer 23. The resist layer 24 is then dried in a forced air oven operating at the same temperature and for the same period as that used in drying the coat of asphaltum.

In order to expose the areas surrounding the eventual conductive pattern to actinic radiations so that the photochemical resist material 24 may be rendered soluble and washed away to leave a stencil pattern similar to the final conductive pattern, the photosensitive resist material 24 is exposed to a suitable light source through a film negative indicated generally at 25 as shown in Fig. 4. The negative 25 comprises dense areas 26 which correspond to the final conductive pattern, the remainder of the film 25 being transparent as indicated at 27. In order to provide clear areas 27 which are absolutely transparent, the film 25 is preferably of the Eastman Kodalith type. The light source to which the photosensitive resist 24 is exposed preferably comprises a bank of blue fluorescent bulbs 28 which are positioned approximately 2½ inches from the surface of the resist material. The exposure time necessary for good definition has been found to be approximately six and one-half minutes.

After the photosensitive resist material has been exposed as described above, the photosensitive emulsion is developed in a bath of water, having a temperature of approximately 145° F., for about one minute. At the end of this period the emulsion develops bubbles in the exposed areas thereof and in some cases actually separates from the asphaltum 23. The portions of the exposed emulsion which have not separated in the developing process are then washed off with a fine spray of cold water so as to leave the photosensitive resist 24 in the stencil pattern shown in Fig. 5. In this connection, it will be understood that the stencil pattern 24 corresponds to the final conductive pattern which is to be formed.

With the resist material in the stencil pattern described above, the asphaltum layer is now removed from the areas which are unprotected by the resist material to provide the master base plate as shown in Fig. 6. The removal of the asphaltum from the unprotected areas may be accomplished by sandblasting the surface thereof with 320 mesh emery powder. After the asphaltum has been removed from the areas surrounding the stencil pattern, the copper layer 22 is removed from the same areas so as to provide the master base plate shown in Fig. 7. The removal of the copper layer 22 is preferably done by etching the same in a solution of ferric chloride, having a specific gravity of between 34 to 40 degrees Baumé.

In order that the insulating and adhesive repellent material, which is deposited in the exposed areas in a manner to be described in more detail hereinafter, may be tightly bonded to the stainless steel base plate 20, the etching operation which is employed to remove the copper layer 22 in the exposed areas is preferably continued after the copper has been entirely removed in these areas so that the stainless steel is etched to a slight degree so as to form a roughened surface in the exposed areas as indicated at 30 in Fig. 7.

After the copper layer 22 has been removed from the exposed areas as described above, the entire master plate is sprayed with a primer coat 31, comprising any one of the fluorocarbons which is adhesive repellent. For example, the primer coat 31 may be of polytetrafluoroethylene, which may be purchased under the trade name of Teflon from E. I. du Pont de Nemours and Company, Inc., of Wilmington, Delaware, the Teflon primer preferably having Du Pont catalog No. 850-201. After the primer coat 31 of Teflon is sprayed onto the master plate, the coating 31 is force dried in an oven at approximately 200° F.

The master plate 20 which is coated with the Teflon primer in the manner described above is then fused at approximately 750° F. until a characteristic change in color of Teflon primer from a dirty brown to a slate gray is evident. The fusing process may be accomplished by any suitable means, such as in an oven or with a flame of suitable temperature. During the fusing process, the latex coat, which has resulted from exposure and development of the photosensitive emulsion, carbonizes and the asphaltum layer beneath is softened, thus causing very poor adhesion of the Teflon primer to the latex layer of photosensitive emulsion and also very poor adhesion of the asphaltum to the copper layer therebeneath. As a result, the latex coat and the asphaltum which has not come off the copper layer 22 in the process of firing can be washed off very conveniently by any suitable means, such as, for example, by washing the same in a bath of kerosene.

With the photosensitive emulsion and asphaltum removed, the master plate appears as illustrated in Fig. 9, wherein the copper layer 22 is exposed in the final desired conductive pattern and a primer coat of Teflon 32 is firmly bonded to the etched areas of the stainless steel base plate 20. The other surfaces of the base plate (back and edges) are also covered by the primer coat so that these surfaces will not be coated during subsequent, successive plating operations. The master plate is then coated with additional layers of Teflon to render the coating impervious to the plating solutions in all places. This is done by spraying on a coating of Teflon clear finish, preferably a clear finish having the Du Pont catalog No. 852-201, over the entire plate and allowing it to dry. When the coat of Teflon clear finish is dry the plate is fired at 750° F. or above. The length of both the drying period and firing period may be conveniently determined by inspecting the plate. Thus, when the drying period is completed the plate will have a milky white appearance, and when the plate is fired the coating will be transparent. Successive coats of Teflon clear finish are applied to the master plate in the manner described above so as to build up the Teflon to a substantial thickness. Thus, referring to Fig. 10, the Teflon is built up over the entire surface of the master plate so as to form the layer indicated at 33 over the copper pattern 22. In order to strengthen the bond of the Teflon coating to the stainless steel base member and also to preserve the temper of the stainless steel base plate 20, the master plate is quenched in cold water after each Teflon clear finish coat is fired. Also, in the application of each coat of Teflon clear finish to the surface of the master plate, the firing process is allowed to continue to such a point that oxidation of the copper pattern 22 occurs. By allowing the firing process to continue to this point the Teflon coating 33 which overlies the desired conductive pattern 22 may be readily removed by a scraping or buffing operation since the Teflon does not adhere well to the oxide oxide thus formed nor does the copper oxide adhere to the copper.

When a sufficient number of coats of Teflon clear finish have been applied to the master plate to build up the areas 32 to the desired thickness, a sufficient amount of the Teflon coating is removed by a suitable scraping or buffing process to expose the printing areas 22 and leave the master plate in the condition shown in Fig. 11. Thus, as shown, the copper pattern 22 is imbedded between walls of Teflon 32 which are firmly bonded to the stainless steel base plate 20. Preferably the thickness of the Teflon walls 32 is just slightly less than the thickness of the copper layer 22 so as to facilitate removal of the copper pattern.

The final operation in preparing the master base plate consists in removing the copper pattern from the stainless steel base plate 20 so as to provide the finished master plate shown in Fig. 12. As shown, the finished master plate comprises the built up layer 32 of Teflon which is firmly bonded to the stainless steel plate and which defines the exposed areas 35 corresponding to the conductive pattern which is to be produced. In this connection, it will be remembered that the areas 35 have a high polish due to the fact that these areas were covered by the copper layer 22 during the etching process in which the roughened areas 30 are formed. The removal of the copper layer 22 from the areas 35 may be accomplished by any suitable means such as by prying these strips out of their channels between the Teflon walls 32. Alternatively, the copper strips 22 may be removed by transferring them onto some other material by means of the transfer process referred to generally heretofore and described in detail in connection with Figs. 13 and 14.

With the finished master plate shown in Fig. 12, the master may be used over and over again to form any number of electrical circuits of the predetermined pattern of the master, on base plates of suitable insulating material. Thus, the desired metal, such as copper, is plated onto the base plate in the areas 35 thereof and in the manner similar to that discussed in connection with the electro-deposition of the layer 22 onto the master base plate. The electro-deposited conductive pattern 36 (Fig. 13) is then transferred to a suitable insulated base member 37. The insulating panel, or base member 37, is prepared for the transfer thereto of the conductive pattern by first thoroughly washing the surface to which the pattern is to be transferred in a suitable solvent, then cleaning with a synthetic detergent and completing the cleansing by washing with warm water to rinse off any residue of solvent or detergent. The panel 37 is then coated with a suitable adhesive. The adhesive may comprise a phenolic-vinyl compound having thermosetting properties such as the adhesive which may be purchased from the Bakelite Corporation under their catalog No. BJ–16320, or the adhesive may be a natural rubber-phenolic compound also having thermosetting properties, such as the adhesive obtained from the United States Rubber Company under their catalog No. 6136. Alternatively, a film type adhesive, such as the adhesive which may be purchased under the trade name Scotch-Weld from the Minnesota Mining and Manufacturing Company, may be employed.

The insulating plate 37 may be provided with a layer 38 of adhesive by any suitable method. For example, the adhesive may be sprayed onto the entire panel. Alternatively, a selective roller coating or a duplicate of the master plate may be used on an offset press, the adhesive being transferred by means of a resilient blanket. The solvent in the adhesive is then allowed to evaporate until a non-tacky appearance is obtained. The electro-deposited conductive pattern 36 is also coated with a suitable adhesive by roller coating or offset printing and the solvent allowed to evaporate, as described above.

In order to transfer the conductive pattern 36 to the insulating panel 37, the two adhesive coated surfaces are joined and subjected to heat and pressure so that the conductive pattern 36 becomes bonded to the insulating panel and when the members are separated the conductive pattern 36 readily parts from the polished surface of the master plate. By subjecting the members to heat as well as pressure during the transfer process, a partial cure of the adhesive is accomplished. In this connection, it will be understood that the upper surfaces of the Teflon areas 32 are extremely adhesive repellent and correspondingly little, if any, adhesive is deposited thereon either during the original coating of the base plate or during the transfer process. The finished product which comprises the insulating panel 37 to which is bonded the conductive strips 36 which are arranged in a predetermined pattern (Fig. 14) is given a final cure by subjecting the same to heat and pressure after the panel has been separated from the master plate. It will be understood that after the individual panels have been separated from the master plate they may be cured simultaneously. Preferably the temperature to which the panels are subjected during the final curing process is between 250° F. and 350° F. for a period of from one to ten minutes and curing pressures range between 50 p. s. i. and 200 p. s. i., depending upon the work involved.

In the event that a simplified method of producing the master base plate is desired, in which the steps necessary in using a photosensitive resist material are eliminated, a fluorocarbon which is photosensitive may be coated directly onto the polished stainless steel base plate. The photosensitive Teflon primer is then exposed, developed and fired so as to provide a thin coating of Teflon primer in the areas surrounding the final conductive pattern. Copper is then plated onto the exposed areas of the base plate so as to provide an assembly substantially similar to the master plate shown in Fig. 9, with the exception, however, that the surface of the stainless steel plate is not etched beneath the Teflon primer coat. The master plate is then subjected to successive coats of Teflon clear finish and the intermediate firing operations as described heretofore in connection with Figs. 9 through 12, to provide a master which is substantially similar to that shown in Fig. 12. The transfer process is then performed in a manner entirely similar to that described in connection with Figs. 13 and 14.

While the present invention has been illustrated in connection with a flat master plate, it will be obvious that the master base member may take other shapes and configurations. Thus the master base member may, for example, comprise a split stainless steel cylinder which is used in conjunction with a heated or unheated drum and pressure sensitive or thermosetting adhesive to deposit the conductive pattern on suitable work pieces. The pattern of insulating and adhesive repellent material would be formed on the outside of the stainless steel cylinder in a manner entirely similar to that described heretofore in connection with a flat master base plate.

From the foregoing, it is evident that the present invention provides a new and improved method of making conductive patterns of predetermined configuration in which a master plate is first formed having areas corresponding to the final conductive pattern which have excellent parting characteristics with respect to a metal which is electro-deposited thereon and having the remaining areas thereof coated with a suitable fluorocarbon material which is highly adhesive repellent. The desired metal is then electrodeposited onto the master and transferred therefrom to an insulating panel, the master being utilized repeatedly to mass produce conductive patterns of the desired configuration.

It should be understood that the present invention is not limited to the specific details described, nor in the specific sequence of the method steps, and it is intended in the appended claims to cover all changes and modifications of the present invention which fall within the true spirit and scope thereof.

What is claimed as new and is desired to be secured by Letters Patent of the United States is:

1. The method of producing a conductive pattern of predetermined configuration on an insulating base member which comprises the steps of, forming on a conductive master base plate a fluorocarbon stencil having a configuration which is the negative of the eventual conductive pattern, electro-depositing a layer of conductive material onto the areas of said master plate which are unmasked by said stencil, and transferring the conductive pattern thus formed to the insulating base member by engagement of the surfaces of said plate and said member.

2. The method of producing a conductive pattern of predetermined configuration on an insulating base member which comprises the steps of, forming a fluorocarbon stencil on a highly polished stainless steel master base plate, said stencil having a configuration which is the negative of the eventual conductive pattern, electro-depositing a layer of conductive material onto the areas of said master plate which are unmasked by said stencil, and transferring the conductive pattern thus formed to the insulating base member by engagement of the surfaces of said plate and said member.

3. The method of producing a conductive pattern of predetermined configuration on an insulating base member which comprises the steps of, forming on a conductive master base plate a fluorocarbon stencil having a configuration which is the negative of the desired conductive pattern, electro-depositing a layer of conductive material onto the exposed areas of said master plate, coating said master plate and the insulating base member with an adhesive, pressing said adhesive coated surfaces together, and separating said base member with said metal layer adhering thereto from said master plate.

4. The method of producing a conductive pattern of predetermined configuration on an insulating base member which comprises the steps of, forming a fluorocarbon stencil on a highly polished stainless steel master base plate, said stencil having a configuration which is the negative of the desired conductive pattern, electro-depositing a layer of conductive material onto the exposed areas of said master plate, coating said master plate and the insulating base member with an adhesive, pressing said adhesive coated surfaces together, and separating said base member with said metal layer adhering thereto from said master plate.

5. The method of producing a conductive pattern of predetermined configuration on a base plate of insulating material which comprises the steps of, forming a stencil of fluorocarbon material on a conductive master base plate, plating a layer of the desired metal onto said master plate in the pattern defined by said stencil, coating the surface of said plated layer and said base plate with an adhesive, joining said adhesive coated surfaces and subjecting them to heat and pressure thereby to transfer said plated pattern onto said base plate and partially to cure said adhesive, and finally curing said adhesive by subjecting the same to heat and pressure.

6. In the process of producing a conductive pattern of predetermined configuration on an insulating base member, the method of forming a master plate for transferring a conductive pattern of said predetermined configuration to insulating base members which comprises the steps of, electro-depositing on a conductive master base plate a layer of metal having relatively slight adherence thereto, forming a stencil of resist material on said metal layer having a configuration corresponding to the eventual conductive pattern, removing said metal layer in the areas unmasked by said stencil, depositing a layer of insulating and adhesive repellent material in said unmasked areas to a depth not greater than the thickness of said metal layer, and stripping the remaining pattern of said metal layer from said master base plate.

7. In the process of producing a conductive pattern of predetermined configuration on an insulating base member, the method of forming a master plate for transferring a conductive pattern of said predetermined configuration to insulating base members which comprises the steps of, electro-depositing on a conductive master base plate a layer of metal having relatively slight adherence thereto, forming a stencil of resist material on said metal layer having a configuration corresponding to the eventual conductive pattern, etching said master plate to remove said metal layer in the areas unmasked by said stencil and to roughen the surface of said plate in said unmasked areas, depositing a primer coat of insulating and adhesive repellent material on said master plate, firing said primer coat to bond the same to the unmasked areas of said master plate, depositing a layer of insulating and adhesive repellent material in said unmasked areas to a depth not greater than the thickness of said metal layer, and stripping the remaining pattern of said metal layer from said master base plate.

8. The method of forming a master plate suitable for transferring conductive patterns of predetermined configuration to insulating base members which comprises the steps of, electro-depositing on a highly polished stainless steel plate a layer of metal having relatively slight adherence thereto, forming a stencil of resist material on said metal layer having a configuration corresponding to the eventual conductive pattern, removing said metal layer in the areas unmasked by said stencil, depositing a layer of fluorocarbon material in said unmasked layer to a depth not greater than the thickness of said metal layer, and stripping the remaining pattern of said metal layer from said plate.

9. The method of producing a conductive pattern of predetermined configuration on an insulating base member which comprises the steps of, electro-depositing on a highly polished stainless steel master base plate a layer of metal, forming a stencil of resist material on said metal layer having a configuration corresponding to the desired conductive pattern, removing said metal layer in the areas unmasked by said stencil, depositing a layer of fluorocarbon material on said unmasked areas to a depth approximately equal to said metal layer, coating a surface of said master plate and the insulating base member with an adhesive, pressing said adhesive coated surfaces together, and separating said base member with said metal layer adhering thereto from said master base plate.

10. As an article of manufacture, a master transfer plate suitable for use in producing conductive patterns of predetermined configuration, comprising a stainless steel base member having approximately 18% chromium and 8% nickel and having a highly polished surface, said plate having the fluorocarbon stencil formed thereon by first plating onto said base member a layer of metal having relatively slight adherence thereto, then forming a stencil of resist material on said metal layer having a configuration corresponding to the desired conductive pattern, then removing said metal layer in the areas unmasked by said stencil, then depositing on said unmasked areas a fluorocarbon material to the level of said metal layer, and finally stripping the remaining pattern of said metal layer from said base member.

11. As an article of manufacture, a master transfer plate suitable for use in producing conductive patterns of predetermined configuration, comprising a stainless steel base member having approximately 18% chromium and 8% nickel and having a highly polished surface, said plate having the fluorocarbon stencil formed thereon by first plating onto said base member a layer of metal having relatively slight adherence thereto, then forming a stencil of resist material on said metal layer having a configuration corresponding to the desired conductive pattern, then removing said metal layer in the areas unmasked by said stencil, and finally depositing a fluorocarbon material on said unmasked areas to the height of said metal layer.

12. The method of producing a conductive pattern of predetermined configuration on an insulating base member which comprises the steps of, depositing a layer of photosensitive fluorocarbon material on a master base plate, exposing said photosensitive material to actinic radiations in the areas surrounding the eventual conductive pattern and developing the same to provide a stencil of fluorocarbon on said master plate, electro-depositing a layer of conductive material onto the areas of said master plate unmasked by said stencil, and transferring the conductive pattern thus formed to an insulating base member by pressing the insulating base member and master plate together and separating the same with the conductive pattern adhering to the insulating base member.

13. The method of producing a conductive pattern of predetermined configuration on an insulating base member which comprises the steps of, depositing a layer of photosensitive fluorocarbon material on a highly polished stainless steel master base plate, exposing said photosensitive material to actinic radiations in a pattern corresponding to the negative of the eventual conductive pattern, developing said photosensitive material to provide a stencil of fluorocarbon on said master base plate, electro-depositing a layer of conductive material onto the areas of said master plate unmasked by said stencil, coating a surface of said master plate and an insulating base member with an adhesive, pressing said adhesive coated surfaces together, and separating said base member from said master base plate with said conductive layer of said predetermined pattern adhering to said base member.

14. The method of producing a master base plate suitable for use in transferring conductive patterns of predetermined configuration to insulating base members which comprises the steps of, electro-plating onto a highly polished stainless steel master base plate a layer of conductive material, depositing on said plated layer a coating of asphaltum, depositing on said asphaltum layer a layer of photosensitive resist material which is rendered soluble in a selected developing fluid by the action of actinic radiations, exposing said resist layer to actinic radiations in the areas surrounding the conductive pattern to be produced, developing said resist layer to produce an emulsion in said exposed layers, removing said emulsion from said exposed areas, etching said plate layer to remove the portions thereof in said exposed areas, said etching being sufficiently deep to roughen the surface of said master base plate in said exposed areas, depositing a primer coat of fluorocarbon material over the entire surface of said base plate, firing said primer coat to remove said layers of resist material and asphaltum and bond said primer coat to said exposed areas, building up said exposed areas to the height of said plated layer by depositing thereon successive coats of fluorocarbon and quenching said plate between applications of successive coats, and stripping said plated layer from said unexposed areas.

15. The method of producing a master base plate suitable for use in transferring conductive patterns of predetermined configuration to insulating base members which comprises the steps of, electro-plating onto a highly polished stainless steel master base plate a layer of conductive material, depositing on said plated layer a coating of asphaltum, depositing on said asphaltum layer a layer of photosensitive resist material which is rendered soluble in a selected developing fluid by the action of actinic radiations, exposing said resist layer to actinic radiations in the areas surrounding the conductive pattern to be produced, developing said resist layer to produce an emulsion in said exposed layers, removing said emulsion from said exposed areas, etching said plated layer to remove the portions thereof in said exposed areas, said etching being sufficiently deep to roughen the surface of said master base plate in said exposed areas, depositing a primer coat of fluorocarbon material over the entire surface of said base plate, firing said primer plate to remove said layers of resist material and asphaltum, building up said exposed areas to the height of said plated layer by successively depositing a coat of fluorocarbon in said areas firing said deposited coat and quenching said plate to strengthen the bond of said fluorocarbon material in said exposed areas and stripping said plated layer from said unexposed areas.

KURT ENSLEIN.
FRED J. HASKINS.

References Cited in the file of this patent

UNITED STATES PATENTS

| Number | Name | Date |
|---|---|---|
| 2,441,960 | Eisler | May 25, 1948 |
| 2,447,541 | Sabee | Aug. 24, 1948 |
| 2,506,604 | Lokker et al. | May 9, 1950 |

OTHER REFERENCES

Brunetti, Printed Circuit Techniques, National Bureau of Standards Circular 468, 43 pages, 1947.